US010112840B2

(12) United States Patent
Liu et al.

(10) Patent No.: US 10,112,840 B2
(45) Date of Patent: Oct. 30, 2018

(54) MODIFIED Y MOLECULAR SIEVE AND PREPARATION METHOD AND USE THEREOF, SUPPORTED CATALYST, AND HYDROCRACKING METHOD

(71) Applicants: CHINA PETROLEUM & CHEMICAL CORPORATION, Beijing (CN); Fushun Research Institute of Petroleum and Petrochemicals, SINOPEC CORP., Fushun, Liaoning (CN)

(72) Inventors: Wei Liu, Liaoning (CN); MingHua Guan, Liaoning (CN); Yanze Du, Liaoning (CN); Fenglai Wang, Liaoning (CN); Chang Liu, Liaoning (CN); Bo Qin, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS SINOPEC CORP., Fushun, Liaoning (CN)

( * ) Notice: Subject to any disclaimer, the term of this patent is extended or adjusted under 35 U.S.C. 154(b) by 182 days.

(21) Appl. No.: 14/930,707

(22) Filed: Nov. 3, 2015

(65) Prior Publication Data
US 2016/0229700 A1 Aug. 11, 2016

(30) Foreign Application Priority Data

Nov. 3, 2014 (CN) .......................... 2014 1 0603764

(51) Int. Cl.
| | | |
|---|---|---|
| *B01J 29/06* | (2006.01) | |
| *C01B 39/24* | (2006.01) | |
| *B01J 35/00* | (2006.01) | |
| *B01J 29/12* | (2006.01) | |
| *C10G 47/16* | (2006.01) | |
| *C10G 47/20* | (2006.01) | |
| *B01J 23/888* | (2006.01) | |
| *B01J 29/16* | (2006.01) | |
| *B01J 35/10* | (2006.01) | |
| *B01J 37/02* | (2006.01) | |
| *C01B 39/06* | (2006.01) | |
| *B01J 29/08* | (2006.01) | |

(52) U.S. Cl.
CPC ............ *C01B 39/24* (2013.01); *B01J 23/888* (2013.01); *B01J 29/084* (2013.01); *B01J 29/126* (2013.01); *B01J 29/166* (2013.01); *B01J 35/002* (2013.01); *B01J 35/0006* (2013.01); *B01J 35/1019* (2013.01); *B01J 35/1038* (2013.01); *B01J 35/1042* (2013.01); *B01J 35/1071* (2013.01); *B01J 37/0207* (2013.01); *C01B 39/06* (2013.01); *C10G 47/16* (2013.01); *C10G 47/20* (2013.01); *B01J 2029/081* (2013.01); *B01J 2229/16* (2013.01); *B01J 2229/186* (2013.01); *B01J 2229/20* (2013.01)

(58) Field of Classification Search
CPC ...... B01J 29/084; B01J 29/166; B01J 29/126; B01J 2029/081; B01J 2229/186; B01J 2229/16; B01J 35/1071; B01J 35/1042; B01J 35/1038; B01J 35/1019; B01J 35/002; B01J 35/0006; B01J 37/0207; C01B 39/24
USPC .......................................... 502/60, 74, 79, 85
See application file for complete search history.

(56) References Cited

U.S. PATENT DOCUMENTS

2011/0224067 A1 9/2011 Wormsbecher et al.
2016/0229700 A1 8/2016 Liu et al.

FOREIGN PATENT DOCUMENTS

| CN | 1178721 A | 4/1998 |
|---|---|---|
| CN | 1253988 A | 5/2000 |
| CN | 1609175 A | 4/2005 |
| CN | 101380589 A | 3/2009 |
| CN | 101450320 A | 6/2009 |
| CN | 101618348 A | 1/2010 |
| CN | 101723400 A | 6/2010 |
| CN | 101759198 A | 6/2010 |
| CN | 103240114 A | 8/2013 |
| CN | 103406143 B | 11/2013 |
| CN | 103011192 A | 10/2014 |
| GB | 2535574 A | 8/2016 |

OTHER PUBLICATIONS

Shiwen Cheng, "Study on the modified Y zeolites of hydrocracking catalysts", May 18, 2011, Master's Degree Thesis, Beijing University of Chemical Technology.

*Primary Examiner* — Elizabeth D Wood
(74) *Attorney, Agent, or Firm* — Novick, Kim & Lee, PLLC; Allen Xue

(57) ABSTRACT

The present invention discloses a modified Y molecular sieve, a preparation method and a use of the modified Y molecular sieve, a supported catalyst, and a hydrocracking method. The silica-alumina mole ratio in the surface layer of the modified Y molecular sieve is 20-100:1, and the silica-alumina mole ratio in the body phase of the modified Y molecular sieve is 8-30:1. When a hydrocracking catalyst prepared from the modified Y molecular sieve is used for hydrocracking, the hydrocracking catalyst has higher reactivity and higher nitrogen tolerance. The hydrocracking catalyst prepared from the modified Y molecular sieve is suitable for use for increasing the yield of diesel oil, increasing the yield of chemical materials, and catalyzed hydrogenation conversion of diesel oil, etc.

20 Claims, 2 Drawing Sheets

MODIFIED Y MOLECULAR SIEVE AND PREPARATION METHOD AND USE THEREOF, SUPPORTED CATALYST, AND HYDROCRACKING METHOD

CROSS REFERENCE TO RELATED APPLICATION

This application claims priority to Chinese Application No. 201410603764.x filed on Nov. 3, 2014, entitled "Modified Y Molecular Sieve and Method for Preparing the same", which is specifically and entirely incorporated by reference.

FIELD OF THE INVENTION

The present invention relates a modified Y molecular sieve, a preparation method and a use of the modified Y molecular sieve, a supported catalyst that contains the Y molecular sieve, and a hydrocracking method that utilizes the supported catalyst.

BACKGROUND OF THE INVENTION

The hydrocracking technique has advantages including high adaptability to raw materials, high flexibility in production operation and product scheme, and high product quality, etc., and it can be used to directly convert heavy and poor-quality input materials into base materials for high-quality jet fuel, diesel oil, and lubricant, and produce chemical raw materials for ethylene from naphtha and tailings by steam cracking. It has become one of the most important deep processing techniques for heavy oils, and is widely applied increasingly in China and foreign countries. The core of a hydrocracking process is the hydrocracking catalyst. A hydrocracking catalyst is a typical bi-functional catalyst, with hydrogenation function and cracking function, wherein the hydrogenation function is usually provided by active metal elements in vulcanized state, such as W, Mo, and Ni, etc., while the cracking function is provided by a molecular sieve. Presently, modified Y molecular sieves are used the most widely in hydrocracking processes. However, owing to the properties of the acidic support in molecular sieves, molecular sieves are particularly sensitive to nitrides. Nitrides may be absorbed on the surface of a molecular sieve and thereby cause molecular sieve poisoning; consequently, the activity of the molecular sieve is severely degraded, and the molecular sieve can't work for long in the industrial production process. In addition, as the acid density in the molecular sieve increases, the nitrogen tolerance of the catalyst will be degraded severely. The method commonly used to solve that problem at present is to treat the Y molecular sieve by dealumination or dealumination and silicon reinsertion to reduce acid sites in the molecular sieve. However, with that method, dealumination happens inside and outside of the molecular sieve at the same time in the treatment process; consequently, the activity of the molecular sieve is severely decreased as the acid sites are reduced, while the silica-alumina mole ratio in the molecular sieve is increased. Hence, there is a contradiction between improving the nitrogen tolerance of the catalyst and keeping the hydrocracking activity of the catalyst, and it is difficult to make a trade-off between the two aspects through a conventional molecular sieve modification process.

In CN101450320A, a hydrocracking catalyst that contains a Y molecular sieve and a method for preparing the hydrocracking catalyst are disclosed. The catalyst comprises a hydrogenation active metal material and a support composed of a modified Y molecular sieve and alumina, wherein the modified Y molecular sieve has 750-850 $m^2/g$ specific surface area, 0.35-0.48 ml/g total pore volume, 90-130% relative crystallinity, 2.437-2.445 nm crystal cell parameter, silica-alumina mole ratio equal to 15-70, 0.5-1.0 mmol/g acid content measured by NIS, ratio of B-acid/L-acid greater than 7.0, and sodium oxide content ≤0.05 wt %. Specifically, the patent document discloses that the modified Y molecular sieve is prepared by dealumination and silicon reinsertion with ammonium hexafluorosilicate and hydrothermal treatment, and then treatment with a mixture solution of aluminum salt and inorganic acid or organic acid.

In CN101618348A, a hydrocracking catalyst support and a method for preparing the hydrocracking catalyst support are disclosed. The support contains modified Y molecular sieve, amorphous silica-alumina and alumina, wherein the modified Y molecular sieve has 750-850 $m^2/g$ specific surface area, 0.35-0.48 ml/g total pore volume, 90-130% relative crystallinity, 2.437-2.445 nm crystal cell parameter, silica-alumina mole ratio equal to 15-70, 0.5-1.0 mmol/g acid content measured by NIS, ratio of B-acid/L-acid greater than 7.0, and sodium oxide content ≤0.05 wt %. Specifically, the patent document discloses that the modified Y molecular sieve is prepared by dealumination and silicon reinsertion with ammonium hexafluorosilicate and hydrothermal treatment, and then treatment with a mixture solution of aluminum salt and inorganic acid or organic acid.

In CN1253988A, a nitrogen-tolerant hydrocracking catalyst for increasing the yield of middle distillates is disclosed, comprising: 10-60 wt % amorphous silica-alumina, 10-40 wt % VIB metal oxide, 1-10 wt % VIII metal oxide, and 1-10% IVB metal oxide, wherein the catalyst contains 1-40 wt % modified Y zeolite, which has silica-alumina mole ratio equal to 9-15, 95-100% crystallinity, 750-950 $m^2/g$ specific surface area, $24.23$-$24.45 \times 10^{-10}$ m crystal cell parameter, with pores in pore diameter $>1.7 \times 10^{-10}$ m accounting for 40-70% of the total pore volume. The catalyst can be used for producing middle distillates from heavy distillates by one-stage hydrocracking, and the nitrogen content in the input material in the cracking section can be 100 μg/g, but the catalyst has poor activity.

SUMMARY OF THE INVENTION

To overcome the drawback or poor nitrogen tolerance property of the hydrocracking catalysts in the prior art, the present invention provides a modified Y molecular sieve, a preparation method and an application of the modified Y molecular sieve, a supported catalyst, and a hydrocracking method.

To attain the objects described above, the present invention provides a modified Y molecular sieve, wherein the silica-alumina mole ratio in the surface layer of the modified Y molecular sieve is 20-100:1, the silica-alumina mole ratio in the body phase of the modified Y molecular sieve is 8-30:1, and the silica-alumina mole ratio in the surface layer of the modified Y molecular sieve is higher than the silica-alumina mole ratio in the body phase at least by 10.

The present invention further provides a method for preparing the modified Y molecular sieve, comprising: (1) treating Na—Y zeolite by ammonium exchange, so that the Na content calculated in $Na_2O$ in the Y molecular sieve obtained after ammonium exchange is not higher than 3 wt %; (2) treating the Y molecular sieve after ammonium exchange in the step (1) by primary dealumination, so that the silica-alumina mole ratio in the Y molecular sieve treated by primary dealumination is increased by 2-8; (3) treating the Y molecular sieve after primary dealumination in the step (2) by carbon deposition treatment, so that 60-90 vol % of pores and channels in the Y molecular sieve treated by primary dealumination is filled up; (4) treating the product obtained in the step (3) by secondary dealumination, to form a surface layer of the modified Y molecular sieve, in which the silica-alumina mole ratio is higher than the silica-alumina mole ratio of the Y molecular sieve treated by primary dealumination by 10-80; (5) treating the Y molecular sieve treated by secondary dealumination in the step (4) by carbon burning.

The present invention further provides a modified Y molecular sieve prepared with the method provided in the present invention.

The present invention further provides a use of the modified Y molecular sieve provided in the present invention in nitrogen-tolerant hydrocracking reactions.

The present invention further provides a supported catalyst, comprising a hydrogenation active component and a support, wherein the support contains the modified Y molecular sieve provided in the present invention.

The present invention further provides a hydrocracking method, comprising: hydrocracking a raw material to be hydrocracked, in the presence of hydrogen gas and a hydrocracking catalyst; wherein the hydrocracking catalyst is the supported catalyst provided in the present invention.

In the modified Y molecular sieve provided in the present invention, since the silica-alumina mole ratio in the surface layer is different to that in the inner layer, and the silica-alumina mole ratio in the surface layer is significantly higher, on one hand, the nitrogen tolerance of the molecular sieve can be improved; on the other hand, since the silica-alumina mole ratio in the inner layer of the molecular sieve is not increased or not increased significantly, i.e., the aluminum content in the inner layer is kept at a high value, the molecular sieve still has high catalytic activity. Hence, a problem in the prior art, i.e., a modified molecular sieve has a high overall silica-alumina mole ratio but has low catalytic activity, while an unmodified molecular sieve has poor nitrogen tolerance, is solved, and the contradiction between improving nitrogen tolerance of a catalyst and maintaining the hydrocracking activity of the catalyst is successfully eliminated. When a hydrocracking catalyst prepared from the modified Y molecular sieve is used for hydrocracking, the hydrocracking catalyst has higher reactivity and higher nitrogen tolerance. The hydrocracking catalyst prepared from the modified Y molecular sieve is suitable for use for increasing the yield of diesel oil, increasing the yield of chemical materials, and catalyzed hydrogenation conversion of diesel oil, etc.

The method for preparing the modified Y molecular sieve provided in the present invention employs a carbon protection approach to protect the pores and channels in the molecular sieve, and carries out dealumination and silicon reinsertion externally for the molecular sieve while keeping a low silica-alumina mole ratio inside the molecular sieve. Thus, different silica-alumina mole ratios are obtained in the same molecular sieve, and thereby the molecular sieve obtained with the method meets nitrogen tolerance and catalytic activity requirements. Compared with mixed molecular sieves obtained by mixing molecular sieves with different silica-alumina mole ratios in the prior art, the molecular sieve obtained with the method provided in the present invention have advantages including more uniform properties and more stable product quality, etc.

Other aspects and advantages of the present invention will be further detailed in the embodiments hereunder.

BRIEF DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. Among the drawings.

DETAILED DESCRIPTION

Hereunder some embodiments of the present invention will be detailed. It should be appreciated that the embodiments described here are only provided to describe and explain the present invention, but shall not be deemed as constituting any limitation to the present invention.

The term "carbon deposition treatment" as used herein refers to filling the pores and channels of the Y molecular sieve with carbon derived from the carbon source.

The term "carbon deposition reaction" as used herein refers to a reaction converting the carbon source into carbon in an oxygen-bearing atmosphere.

The term "carbon burning" as used herein refers to calcinating the Y molecular sieve treated by secondary dealumination, so that the residual carbon in the Y molecular sieve treated by secondary dealumination is removed and the structure of the pores and channels in the inner layer are recovered.

The present invention provides a modified Y molecular sieve, wherein the silica-alumina mole ratio in the surface layer of the modified Y molecular sieve is 20-100:1, the silica-alumina mole ratio in the body phase of the modified Y molecular sieve is 8-30:1, and the silica-alumina mole ratio in the surface layer of the modified Y molecular sieve is higher than the silica-alumina mole ratio in the body phase at least by 10.

In the present invention, the silica-alumina mole ratio is the mole ratio of silica to alumina.

In the present invention, the silica-alumina mole ratio in the body phase refers to the overall silica-alumina mole ratio in the modified molecular sieve.

In the present invention, the silica-alumina mole ratio in the body phase is measured by chemical analysis. The silica-alumina mole ratio in the surface layer is measured by TEM (Transmission Electron Microscopy) with XPS (X-Ray Photoelectron Spectroscopy).

Figure 1:
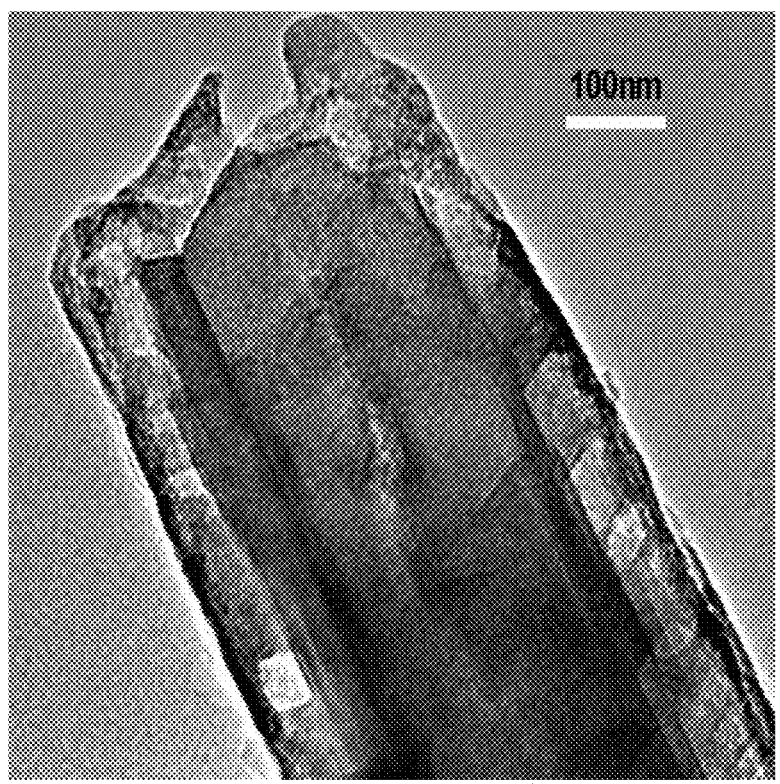
FIG. 1 is a TEM photo of the modified Y molecular sieve prepared in example 1.

FIG. 1 is a TEM photo of the modified Y molecular sieve prepared in example 1, showing that the crystal grains have a light colored part and a dark colored part, wherein the light colored part is the surface layer of the modified Y molecular sieve. The silica-alumina mole ratio at different positions in the surface layer can be measured continuously by TEM with XPS, and the silica-alumina mole ratio in the dark colored part can also be measured. Hence, the thickness of the surface layer can be determined according to the color difference in the TEM photo, or the silica-alumina mole ratio at different positions in the modified Y molecular sieve can be measured by TEM with XPS and then the thickness of the surface layer can be determined (any position where the silica-alumina mole ratio is lower than 20 doesn't belong to the surface layer).

The modified Y molecular sieve provided in the present invention can be obtained by treating a Y molecular sieve by in-situ secondary dealumination, as described in the preparation method further provided hereunder. Wherein the silica-alumina mole ratio in the Y molecular sieve obtained by primary dealumination is lower than 20, usually is 6-13. Hence, in the present invention, the part with a silica-alumina mole ratio not lower than 20 is defined as the surface layer.

Preferably, the silica-alumina mole ratio in the surface layer of the modified Y molecular sieve is higher than the silica-alumina mole ratio in the body phase by 20-70.

Preferably, the silica-alumina mole ratio in the surface layer is 30-80:1.

According to the present invention, preferably, the thickness of the surface layer is 10-200 nm, preferably is 50-190 nm.

Preferably, the surface layer is formed by in-situ dealumination. That is to say, the crystal grains of the Y molecular sieve before modification are treated by dealumination and silicon reinsertion on the surface, so that a surface layer with a higher silica-alumina mole ratio is obtained, while the inner layer covered by the surface layer still has a silica-alumina mole ratio that is essentially the same as that in the Y molecular sieve before modification. Thus, a modified Y molecular sieve composed of a surface layer and an inner layer is obtained.

According to the present invention, preferably, the grain size of the modified Y molecular sieve is 0.4-1.2 μm. The grain size is measured by SEM.

According to the present invention, preferably, the acid content measured by NIS in the modified Y molecular sieve is 0.3-1.5 mmol/g, preferably is 0.4-1.2 mmol/g. In the present invention, the acid content is measured by near infrared spectrometry with pyridine as the adsorbent, with a Nicolet 6700 FTIR spectrometer from NICOLET, through the following process:

Take 20 mg ground sample (with granularity lower than 200 mpi), press it into a flake in 20 mm diameter, and mount the flake on a sample holder of absorption cell; take 200 mg sample (in flake shape) and load it into a cup suspended on the lower end of a quartz spring (log the spring length before the sample is loaded, $x_1$, mm); connect the absorption cell with a adsorption tube, and carry out vacuum pumping, till the vacuum pressure is $4 \times 10^{-2}$ Pa; heat up to 500° C. and hold for 1 h, to remove adsorbates from the surface of the sample (log the spring length after sample purification, $x_2$, mm). Then, cool down to room temperature, absorb pyridine to saturated state, and then heat up to 160° C. hold for 1 h to a balanced state, and desorb the pyridine absorbed physically (log the spring length after pyridine adsorption, $x_3$, mm); calculate the total acid amount with the pyridine adsorption method, and log the infrared spectrogram obtained under the above condition, wherein B-acid corresponds to 1,545 cm$^{-1}$ spectral band, and L-acid corresponds to 1,455 cm$^{-1}$ spectral band; calculate the ratio of B-acid to L-acid from the ratio of peak areas of the spectral bands; thus, the total acid amount, B-acid amount, and L-acid amount are obtained.

Wherein the total acid amount is calculated with the pyridine adsorption method, as follows:

Hooke's law (relation between spring elongation and stress): $f=k\Delta x$

When the spring is placed vertically: $m=k\Delta x$ where, m is the mass of the sample, g; $\Delta x$ is the spring elongation, mm; k is the stiffness coefficient of the spring.

$$\frac{\text{Mass of Absorbed Pyridine}/79.1}{\text{Total Acid}} = \frac{\text{Mass of Sample}}{1\ \text{g}}$$

Total acid C (unit: mmol/g)

$$C = \frac{k(x_3 - x_2)}{k(x_2 - x_1) \times 79.1} \text{mol/g} = \frac{x_3 - x_2}{x_2 - x_1} \times \frac{1}{79.1} \text{mol/g} = 12.64 \times \frac{x_3 - x_2}{x_2 - x_1} \text{mmol/g}$$

Note: "79.1" is the mole mass of pyridine, unit: g/mol.

According to the present invention, preferably, the specific surface area of the modified Y molecular sieve is 600-900 m$^2$/g, preferably is 650-850 m$^2$/g; the pore volume of the modified Y molecular sieve is 0.2-0.7 ml/g, preferably is 0.3-0.6 ml/g. The specific surface area and the pore volume are measured with a low-temperature nitrogen adsorption method (BET method).

According to the present invention, preferably, the relative crystallinity of the modified Y molecular sieve is 60-130%, preferably is 70-120%. In the present invention, the relative crystallinity is measured with XRD method, with a Dmax-2500 X-ray diffractometer from Rigaku, under Cuk alpha radiation, filtered with graphite single crystal, at 35 KV tube voltage, 40 mA tube current, and 2°/min. scanning rate (2θ), with 4°-35° scanning range. The standard sample is the initial powder of Y molecular sieve used in example 1 in the present invention.

Preferably, the crystal cell constant of the modified Y molecular sieve is 2.425-2.455 nm. The crystal cell constant is measured with XRD method.

In the modified Y molecular sieve provided in the present invention, the silica-alumina mole ratio in the surface layer is different from that in the inner layer, and the silica-alumina mole ratio in the surface layer is higher. Thus, the problem of improving nitrogen tolerance while maintaining catalytic activity in the prior art is solved excellently.

The present invention further provides a method for preparing the modified Y molecular sieve, comprising: (1) treating Na—Y zeolite by ammonium exchange, so that the Na content calculated in Na$_2$O in the Y molecular sieve obtained after ammonium exchange is not higher than 3 wt %; (2) treating the Y molecular sieve after ammonium exchange in the step (1) by primary dealumination, so that the silica-alumina mole ratio in the Y molecular sieve treated by primary dealumination is increased by 2-8; (3) treating the Y molecular sieve after primary dealumination in the step (2) by carbon deposition treatment, so that 60-90 vol % of pores and channels in the Y molecular sieve treated by primary dealumination is filled up; (4) treating the product obtained in the step (3) by secondary dealumination, to form a surface layer of the modified Y molecular sieve, in which the silica-alumina mole ratio is higher than the silica-alumina mole ratio of the Y molecular sieve treated by primary dealumination by 10-80; (5) treating the Y molecular sieve treated by secondary dealumination in the step (4) by carbon burning.

In the method provided in the present invention, a Na—Y molecular sieve is treated by conventional ammonium exchange and conventional light dealumination and silicon reinsertion first, and then is treated by carbon deposition treatment, so that the pores and channels in the molecular sieve are filled by carbon partially. Next, deep dealumination and silicon reinsertion is carried out, so that the silica-alumina mole ratio in the surface layer that is not filled with carbon is further increased; then, carbon burning is carried out, to recover the pores and channels occupied by carbon. Thus, a modified Y molecular sieve with a surface layer having a higher silica-alumina mole ratio is obtained.

In the present invention, the ammonium exchange in the step (1) is usually carried out in an ammonium salt solution, the concentration of which can be 0.3-6 mol/L, preferably is 1-3 mol/L. The ammonium exchange temperature preferably is 60-120° C., and the ammonium exchange time preferably is 1-3 h. More preferably, the ammonium exchange temperature is 60-90° C., and the exchange cycles are 1-4 cycles.

Wherein the silica-alumina mole ratio of the Na—Y zeolite can be 3-6, and the $Na_2O$ content is 6-15 wt %.

The ammonium salt can be one or more of ammonium chloride, ammonium nitrate, ammonium sulfate, ammonium acetate and ammonium oxalate.

In the present invention, the Y molecular sieve obtained through ammonium exchange in the step (1) has the same silica-alumina mole ratio as the Na—Y zeolite, and both the silica-alumina mole ratio of the Y molecular sieve and the silica-alumina mole ratio of the Na—Y zeolite can be measured by chemical analysis.

According to the present invention, the primary dealumination in the step (2) can be one or more of hydrothermal treatment, acid treatment, aluminum salt treatment, and ammonium fluosilicate treatment.

In the present invention, in the case of hydrothermal treatment, the Y molecular sieve treated by ammonium exchange can be treated by hydrothermal treatment in water vapor, wherein the water vapor temperature can be 400-600° C., the water vapor pressure can be 0.01-0.5 MPa, and the water vapor treatment time can be 1-4 h.

In the present invention, in the case of acid treatment, the Y molecular sieve treated by ammonium exchange is treated with an acid, wherein the acid can be an inorganic acid and/or an organic acid, specifically, the acid can be one or more of sulfuric acid, hydrochloric acid, nitric acid, citric acid, oxalic acid and acetic acid, the concentration of the acid calculated in $H^+$ preferably is 0.1-0.7 mol/L, the liquid-solid mass ratio of the acid to the Y molecular sieve treated by ammonium exchange can be 3:1-30:1, the temperature of the acid treatment can be 30-80° C., and the time of the acid treatment can be 0.5-3 h.

In the present invention, in the case of aluminum salt treatment, the aluminum salt can be one or more of aluminum chloride, aluminum sulfate and aluminum nitrate; the concentration of the aluminum salt can be 0.05-2 mol/L; the temperature of the treatment can be 50-120° C., and the time of the treatment can be 0.5-3 h.

In the present invention, in the case of ammonium fluosilicate treatment, water can be added to the Y molecular sieve treated by ammonium exchange to prepare a slurry with 3:1-6:1 liquid-solid mass ratio; then, 0.3-1.2 mol/L ammonium fluosilicate solution can be added, and the mixture can be treated at 50-80° C. for 0.5-2 h, wherein the added amount of the ammonium fluosilicate solution is calculated on the basis of 4-10 g ammonium fluosilicate per 100 g Y molecular sieve treated by ammonium exchange.

In the case that the primary dealumination in the step (2) comprises more than one procedures described above, the procedures can be combined in any order. For example, the procedures can be executed in the following order: ammonium fluosilicate treatment, hydrothermal treatment, and acid treatment.

In the present invention, the material after primary dealumination in the step (2) is dried to obtain a Y molecular sieve treated by primary dealumination; specifically, the drying temperature can be 90-300° C., and the drying time can be 2-10 h.

In the present invention, the silica-alumina mole ratio in the Y molecular sieve after primary dealumination in the step (2) can be measured by chemical analysis, wherein the silica-alumina mole ratio is increased by 2-8 than the silica-alumina mole ratio in the Y molecular sieve treated by ammonium exchange.

According to the present invention, the carbon deposition treatment in the step (3) is carried out in the following Approach A and/or Approach B:

Approach A:

(I) impregnating the Y molecular sieve treated by primary dealumination in a liquid carbon source, so that the liquid carbon source is filled into the pores and channels in the Y molecular sieve treated by primary dealumination, wherein the carbon source is a $C_5$-$C_{15}$ hydrocarbon solvent;

(II) removing the liquid carbon source partially by volatilization, so that 60-90 vol % of pores and channels in the Y molecular sieve treated by primary dealumination are filled by the liquid carbon source.

According to the present invention, in the Approach A, preferably the liquid carbon source is selected from at least one of paraffin hydrocarbon, petroleum ether, carbon tetrachloride, benzene, methyl benzene, ethyl benzene, and dimethyl benzene.

In the approach (I), the impregnation is over-saturated impregnation, and the impregnation time is 1-5 h.

In the step (II) in the Approach A, the liquid carbon source is removed partially by evaporating the solvent. Preferably, the solvent evaporation can be drying. Under drying conditions, the liquid carbon source filled in the pores and channels in the Y molecular sieve treated by primary dealumination is removed essentially step by step from exterior to interior of the molecular sieve. The quantity of the liquid carbon source retained in the pores and channels in the Y molecular sieve treated by primary dealumination can be controlled by controlling the drying temperature and the drying time, so as to control the thickness of the part free of carbon source where the liquid carbon source is removed partially. The drying temperature can be higher than the boiling point of the organic solvent, preferably is 50-300° C.; the drying time can be 1-min., preferably is 3-20 min.

In the present invention, the result that 60-90 vol % of pores and channels in the Y molecular sieve treated by primary dealumination are filled by the liquid carbon source can be ascertained by measuring the saturated water absorption.

Approach B:

(I') controlling the Y molecular sieve treated by primary dealumination to contact with a carbon source fully, so that the carbon source is filled into the pores and channels in the Y molecular sieve treated by primary dealumination, wherein the carbon source is $C_2$-$C_{10}$ normal or isomeric monoene, or dialkene;

(II') carrying out a carbon deposition reaction in an oxygen-bearing atmosphere, so that the carbon source fill in the pores and channels in the Y molecular sieve treated by primary dealumination is converted into carbon;

(III') removing the carbon partially, so that 60-90 vol % of pores and channels in the Y molecular sieve treated by primary dealumination are filled by carbon.

According to the present invention, in the Approach B, the carbon source can be any carbonaceous material in gas or liquid state (at the contact temperature described in the step (I')). To improve the carbon deposition efficiency, preferably the carbon source is at least one of butadiene, pentylene, hexadiene, pentene, heptylene and nonylene.

In the step (I') in the Approach B, the Y molecular sieve treated by primary dealumination is controlled to contact with the carbon source fully by placing the Y molecular sieve treated by primary dealumination in an enclosed gas atmosphere that contains the gas of the carbon source or a liquid that contains the carbon source.

Specifically, the Y molecular sieve treated by primary dealumination is placed in an enclosed gas atmosphere that contains the carbon source or a liquid that contains the carbon source, and an appropriate temperature and an appropriate time are controlled, so that the pores and channels in the Y molecular sieve treated by primary dealumination (particularly the pores and channels in the inner layer of the molecular sieve) are filled partially or fully by the gas that contains the carbon source or the liquid that contains the carbon source. In the gas, the concentration of the carbon source preferably is not lower than 50 vol %, more preferably is not lower than 70 vol %, even more preferably is not lower than 80 vol %, still even more preferably is not lower than 90 vol %. In the liquid, the concentration of the carbon source preferably is not lower than 50 vol %, more preferably is not lower than 70 vol %, even more preferably is not lower than 80 vol %, still even more preferably is not lower than 90 vol %.

More specifically, if the carbon source is in gas state at room temperature, the Y molecular sieve treated by primary dealumination is controlled to contact fully with the carbon source by holding the Y molecular sieve treated by primary dealumination in an enclosed gas atmosphere that contains the gas of the carbon source at 0.1-1.0 MPa pressure for 0.1-2 h; if the carbon source is in liquid state at room temperature, the Y molecular sieve treated by primary dealumination is controlled to contact fully with the carbon source by impregnating the Y molecular sieve treated by primary dealumination in a liquid that contains the carbon source fully at 0.1-1.0 MPa pressure to contact for 0.5-4 h.

In the step (II') in the Approach B, the carbon deposition reaction happens in an oxygen-bearing atmosphere, in which the oxygen content is 10-100 vol %; preferably, the oxygen-bearing atmosphere is air, a mixture of oxygen and inert gasses; the temperature of the carbon deposition reaction is 50-500° C., preferably is 100-400° C., and the time of the carbon deposition reaction is 1-50 h, preferably is 2-40 h.

In the step (III') in the Approach B, the carbon is removed partially by high-temperature calcination. Through high-temperature calcination, the carbon is essentially removed gradually from the exterior to the interior of the molecular sieve. The percentage of the pores and channels filled by carbon in the Y molecular sieve treated by primary dealumination can be controlled by controlling the temperature and time of high-temperature calcination, and thereby the thickness of the part free of carbon in the Y molecular sieve treated by primary dealumination after carbon burning can be controlled. The temperature of the high-temperature calcination is 400-600° C., and the time of the high-temperature calcination is 2-50 min., preferably is 5-20 min. Under the above conditions, the thickness of the surface layer can be controlled at 5-400 nm.

In the present invention, the result that 60-90 vol % of pores and channels in the Y molecular sieve treated by primary dealumination are filled by the carbon source can be ascertained by measuring the saturated water absorption.

According to the present invention, in step (4), the secondary dealumination treatment is a deep dealumination process or a dealumination following with silicon reinsertion process, through which a Y molecular sieve treated by secondary dealumination is formed. The treatment is mainly targeted to the part free of carbon source formed in the Y molecular sieve treated by primary dealumination in the approach or the part free of carbon in the Y molecular sieve treated by primary dealumination in the Approach B, so that the part free of carbon source or the part free of carbon formed in the Y molecular sieve treated by primary dealumination is dealuminated further, and thereby a surface layer with a higher silica-alumina mole ratio is formed on the Y molecular sieve treated by secondary dealumination. Since the follow-up step (5) has no effect on the surface layer, the surface layer is the final surface layer with a higher silica-alumina mole ratio on the modified Y molecular sieve. The degree of secondary dealumination treatment mainly depends on the desired silica-alumina mole ratio in the surface layer of the modified Y molecular sieve.

Preferably, the secondary dealumination treatment can be acid dealumination treatment and/or ammonium fluosilicate dealumination following with silicon reinsertion treatment.

In the present invention, the dealumination treatment refers to a treating process for improving the silica-alumina mole ratio. It can be a sole dealumination process or a dealumination following with silicon reinsertion process.

In the present invention, in the case of acid dealumination treatment, the product obtained in the step (3) can be treated with an acid, which can be an inorganic acid and/or an organic acid; specifically, the acid can be one or more of sulfuric acid, hydrochloric acid, nitric acid, citric acid, oxalic acid and acetic acid; the concentration of the acid calculated in $H^+$ can be 0.3-2 mol/L, preferably be 0.6-1.5 mol/L; the liquid-solid mass ratio of the acid to the product obtained in the step (3) is 3:1-30:1; the temperature of the acid dealumination treatment can be 60-120° C., and the time of the acid dealumination treatment can be 0.5-3 h.

In the present invention, in the case of ammonium fluosilicate dealumination and silicon reinsertion treatment, water is added to the product obtained in the step (3) to prepare a slurry with 3:1-6:1 liquid-solid mass ratio; then, 0.8-2 mol/L ammonium fluosilicate solution is added, and the mixture is treated at 70-120° C. for 1-4 h, wherein the added amount of the ammonium fluosilicate solution is calculated on the basis of 9-30 g ammonium fluosilicate per 100 g Y product obtained in the step (3).

In the present invention, the silica-alumina mole ratio in the surface layer of the modified Y molecular sieve formed in the step (4) can be measured by TEM with XPS. Compared with the Y molecular sieve treated by primary dealumination, the silica-alumina mole ratio in the Y molecular sieve treated by primary dealumination is increased by 10-80.

According to the present invention, in the step (5), the carbon burning is to calcinate the Y molecular sieve treated by secondary dealumination at 400-600° C. for 2-4 h. Thus, the residual carbon in the Y molecular sieve treated by secondary dealumination is removed, so that the structure of the pores and channels in the inner layer are recovered.

The modified Y molecular sieve prepared with the method disclosed in the present invention through the above steps can have a surface layer with a high silica-alumina mole ratio; thus, the problem that conventional molecular sieves or modified molecular sieves can't meet the requirements for nitrogen tolerance and catalytic activity is solved.

The present invention further provides a modified Y molecular sieve prepared with the method provided in the present invention. The modified Y molecular sieve has the structural characteristics described above, for example, the surface layer of the molecular sieve has a higher silica-alumina mole ratio than the body phase of the molecular sieve. These structural characteristics will not be detailed further here.

The present invention further provides a use of the modified Y molecular sieve provided in the present invention in nitrogen-tolerant hydrocracking reactions.

The present invention further provides a supported catalyst, comprising a hydrogenation active component and a support, wherein the support contains the modified Y molecular sieve provided in the present invention.

According to the present invention, the specific surface area of the supported catalyst preferably is 200-400 m$^2$/g, and the pore volume of the catalyst preferably is 0.2-0.5 ml/g.

According to the present invention, the content of the modified Y molecular sieve in the support preferably is 15-90 wt %. The support of the remaining part can be amorphous silica-alumina and/or alumina.

According to the present invention, the hydrogenation active components are a metal element in VIB Family and a metal element in VIII Family; preferably, the metal element in VIB Family is Mo and/or W, and the metal element in VIII Family is Co and/or Ni.

According to the present invention, based on the total weight of the catalyst and calculated in metal oxide, the content of the metal element in VIB Family is 10-40 wt %, and the content of the metal element in VIII Family is 3-15 wt %; the content of the support is 45-87 wt %.

The present invention further provides a hydrocracking method, comprising: hydrocracking a raw material to be hydrocracked, in the presence of hydrogen gas and a hydrocracking catalyst; wherein the hydrocracking catalyst is the supported catalyst provided in the present invention.

According to the present invention, the nitrogen content in the raw material to be hydrocracked is 5-200 m/g, and the hydrocracking conditions include: 6-20 MPa reaction pressure, 350-420° C. reaction temperature, 0.1-2 h$^{-1}$ volumetric space velocity of input of the raw material to be hydrocracked, and 500:1-2,000:1 volume ratio of the hydrogen gas to the raw material to be hydrocracked.

According to the present invention, the method further comprises: hydro-pretreating a raw oil to obtain the raw material to be hydrocracked, wherein the hydro-pretreating conditions include: 6-20 MPa reaction pressure, 350-420° C. reaction temperature, 0.1-2 h$^{-1}$ volumetric space velocity of input of the raw oil, and 500:1-2,000:1 volume ratio of the hydrogen gas to the raw oil; the raw oil is at least one of vacuum gas oil (VGO), coker gas oil (CGO), deasphalted oil (DAO), and FCC light cycle oil (LCO), and the nitrogen content in the raw oil is 500-3,000 µg/g.

Hereunder the present invention will be further detailed in some embodiments.

In the following examples and comparative examples, the specific surface area, pore volume, external specific surface area, and pore distribution are measured with an ASAP2420 cryogenic nitrogen adsorption analyzer from Micromeritics, with the cryogenic nitrogen physical adsorption method defined in GB/T 19587-2004;

The relative crystallinity and crystal cell parameter are measured with a Dmax-2500 X-ray diffractometer from Rigaku, with an X-ray diffraction method;

The silica-alumina mole ratio in the surface layer is measured with a JEM-2100 TEM from JEOL and an EDS from EDAX, with TEM and XPS methods; The silica-alumina mole ratio in the body phase is measured with a ZSX100e XRF analyzer from Rigaku, with a chemical analysis method;

The grain size of the molecular sieve is measured with a JEM-7500L SEM from JEOL.

The carbon filing rate in the internal pores and channels is measured with a saturated water absorptivity method, as follows:

Measure the saturated water absorptivity a of the molecular sieve before the molecular sieve is filled by carbon and the saturated water absorptivity b of the molecular sieve after the molecular sieve is filled by carbon, respectively, and take the difference as the carbon filling rate:

Carbon filling rate=(water absorptivity $a$–water absorptivity $b$)/water absorptivity $a$.

The saturated water absorptivity measurement method is: weigh 100 g molecular sieve, and impregnate it in distilled water at 5:1 liquid-solid volume ratio for 2 h, and then filter;

Water absorptivity=[(volume of immersion liquid–volume of filtrate)/volume of molecular sieve]× 100%.

Example 1

(1) Take 200 g initial powder of Na—Y molecular sieve prepared in a testing lab (the silica-alumina mole ratio is 5.2, and the Na$_2$O content is 12 wt %), mix the Na—Y molecular sieve with 0.5 mol/L ammonium nitrate at 3:1 liquid-solid mass ratio, and carry out ammonium exchange at 70° C. for 3 h; repeat that process for 3 times; after the ammonium exchange, the Na content in the Y molecular sieve calculated in Na$_2$O is 2.5 wt %;

(2) Treat the Y molecular sieve obtain in the step (1) by hydrothermal treatment at 530° C. temperature and 0.1 MPa pressure for 2 h;

(3) Mix the molecular sieve obtained in the step (2) with distilled water at 5:1 liquid-solid mass ratio and stir the mixture, and then heat up to 80° C.; add 400 ml 0.5 mol/L aluminum sulfate solution in the stirring process, and hold for 2 h at the temperature for reaction;

(4) Dry the molecular sieve obtained in the step (3) at 150° C. for 8 h; thus, a Y molecular sieve treated by primary dealumination is obtained; measured by chemical analysis, the silica-alumina mole ratio of the Y molecular sieve is 7.9, increased by 2.7;

(5) Place the molecular sieve obtained in the step (4) in an enclosed container filled with butadiene, control the pressure at 0.3 MPa and hold for 20 min. for extensive contact; next, heat up to 200° C. and hold for 15 h at the temperature in air for carbon deposition reaction; (6) Directly load the molecular sieve treated in step (5) into a muffle furnace preheated to 450° C., and calcinate for 10 min., so that 80 vol % of pores and channels in the Y molecular sieve treated by primary dealumination are filled by carbon;

(7) Mix the molecular sieve obtained in the step (6) with distilled water at 5:1 liquid-solid mass ratio, and then add 100 ml 0.8 mol/L ammonium fluosilicate solution, heat up to 90° C. and treat for 2 h, wherein the added amount of the ammonium fluosilicate solution is calculated on the basis of 9.5 g ammonium fluosilicate per 100 g molecular sieve obtained in the step (6). Measured by TEM with XPS, the silica-alumina mole ratio in the surface layer of the modified Y molecular sieve treated by secondary dealumination is 36.9, increased by 29;

(8) Treat the Y molecular sieve after ammonium fluosilicate treatment in the step (7) by carbon burning which includes drying it at 120° C. for 2 h and calcinating it at 550° C. for 2 h; thus, a modified Y molecular sieve Y-1 is obtained.

Observe Y-1 on a TEM. The photo is shown in FIG. 1. It can be seen that the TEM photo of the molecular sieve Y-1 prepared in the example 1 shows a clear boundary, wherein the light-colored outer layer is the surface coat described in the present invention.

Example 2

(1) Take 200 g initial powder of Na—Y molecular sieve prepared in a testing lab (the silica-alumina mole ratio is 4.8, and the $Na_2O$ content is 12 wt %), mix the Na—Y molecular sieve with 0.5 mol/L ammonium nitrate at 5:1 liquid-solid mass ratio, and carry out ammonium exchange at 90° C. for 1.5 h; repeat that process for 2 times; after the ammonium exchange, the Na content in the Y molecular sieve calculated in $Na_2O$ is 1.8 wt %;

(2) Treat the Y molecular sieve obtain in the step (1) by hydrothermal treatment at 550° C. temperature and 0.1 MPa pressure for 2 h;

(3) Mix the molecular sieve obtained in the step (2) with 400 ml 0.5 mol/L citric acid solution (the concentration is calculated in $H^+$) at 8:1 liquid-solid mass ratio and stir the mixture, and then heat up to 60° C. and hold for 2 h at the temperature for reaction;

(4) Dry the molecular sieve obtained in the step (3) at 250° C. for 2 h; thus, a Y molecular sieve treated by primary dealumination is obtained; measured by chemical analysis, the silica-alumina mole ratio of the Y molecular sieve is 9, increased by 4.2;

(5) Immerse the molecular sieve obtained in step (4) in heptylene for 4 h, and then heat at 200° C. for 10 h in air atmosphere for carbon deposition reaction;

(6) Directly load the molecular sieve treated in step (5) into a muffle furnace preheated to 500° C., and calcinate for 30 min., so that 70 vol % of pores and channels in the Y molecular sieve treated by primary dealumination are filled by carbon;

(7) Mix the molecular sieve obtained in the step (6) with 1.0 mol/L hydrochloric acid (the concentration is calculated in $H^+$) at 7:1 liquid-solid mass ratio, and treat at 80° C. for 2 h. Measured by TEM with XPS, the silica-alumina mole ratio in the surface layer of the modified Y molecular sieve treated by secondary dealumination is 53, increased by 44;

(8) Treat the Y molecular sieve after acid treatment in the step (7) by carbon burning which includes drying it at 120° C. for 2 h and calcinating it at 550° C. for 2 h; thus, a modified Y molecular sieve Y-2 is obtained.

Example 3

(1) Take 200 g initial powder of Na—Y molecular sieve prepared in a testing lab (the silica-alumina mole ratio is 5.2, and the $Na_2O$ content is 12 wt %), mix the Na—Y molecular sieve with 0.5 mol/L ammonium nitrate at 3:1 liquid-solid mass ratio, and carry out ammonium exchange at 65° C. for 3 h; repeat that process for 3 times; after the ammonium exchange, the Na content in the Y molecular sieve calculated in $Na_2O$ is 2.6 wt %;

(2) Mix the molecular sieve obtained in the step (1) with distilled water at 5:1 liquid-solid mass ratio, and then add 100 ml 0.5 mol/L ammonium fluosilicate solution, and treat for 1.0 h at 60° C.;

(3) Treat the Y molecular sieve obtain in the step (2) by hydrothermal treatment at 520° C. temperature and 0.1 MPa pressure for 2 h;

(4) Mix the molecular sieve obtained in the step (3) with distilled water at 5:1 liquid-solid mass ratio and stir the mixture, and then heat up to 80° C.; add 400 ml 0.5 mol/L aluminum sulfate solution in the stirring process, and hold for 2 h at the temperature for reaction;

(5) Dry the molecular sieve obtained in the step (4) at 100° C. for 9 h; thus, a Y molecular sieve treated by primary dealumination is obtained; measured by chemical analysis, the silica-alumina mole ratio of the Y molecular sieve is 8.6, increased by 3.4;

(6) Place the molecular sieve obtained in the step (5) in an enclosed container filled with butadiene, control the pressure at 0.2 MPa and hold for 30 min. for extensive contact; next, heat up to 200° C. and hold for 15 h at the temperature in air for carbon deposition reaction;

(7) Directly load the molecular sieve treated in step (6) into a muffle furnace preheated to 450° C., and calcinate for 8 min., so that 60 vol % of pores and channels in the Y molecular sieve treated by primary dealumination are filled by carbon;

(8) Mix the molecular sieve obtained in the step (7) with distilled water at 5:1 liquid-solid mass ratio, and then add 150 ml 0.8 mol/L ammonium fluosilicate solution, heat up to 95° C. and treat for 2 h, wherein the added amount of the ammonium fluosilicate solution is calculated on the basis of 14 g ammonium fluosilicate per 100 g molecular sieve obtained in the step (6). Measured by TEM with XPS, the silica-alumina mole ratio in the surface layer of the modified Y molecular sieve treated by secondary dealumination is 62.6, increased by 54;

(9) Treat the Y molecular sieve after ammonium fluosilicate treatment in the step (8) by carbon burning which includes drying it at 120° C. for 2 h and calcinating it at 550° C. for 2 h; thus, a modified Y molecular sieve Y-3 is obtained.

Example 4

(1) Take 200 g initial powder of Na—Y molecular sieve prepared in a testing lab (the silica-alumina mole ratio is 5.3, and the $Na_2O$ content is 12 wt %), mix the Na—Y molecular sieve with 0.6 mol/L ammonium nitrate at 3:1 liquid-solid mass ratio, and carry out ammonium exchange at 80° C. for 3 h; repeat that process for 3 times; after the ammonium exchange, the Na content in the Y molecular sieve calculated in $Na_2O$ is 2.0 wt %;

(2) Treat the Y molecular sieve obtain in the step (1) by hydrothermal treatment at 540° C. temperature and 0.1 MPa pressure for 1 h;

(3) Mix the molecular sieve obtained in the step (2) with distilled water at 5:1 liquid-solid mass ratio and stir the mixture, and then heat up to 80° C.; add 400 ml 0.5 mol/L aluminum sulfate solution in the stirring process, and hold for 2 h at the temperature for reaction;

(4) Dry the molecular sieve obtained in the step (3) at 100° C. for 9 h; thus, a Y molecular sieve treated by primary dealumination is obtained; measured by chemical analysis, the silica-alumina mole ratio of the Y molecular sieve is 8.8, increased by 3.5;

(5) Immerse the molecular sieve obtained in step (4) in hexadiene for 3 h, and then heat at 150° C. for 25 h in air atmosphere for carbon deposition reaction;

(6) Directly load the molecular sieve treated in step (5) into a muffle furnace preheated to 410° C., and calcinate for 5 min., so that 80 vol % of pores and channels in the Y molecular sieve treated by primary dealumination are filled by carbon;

(7) Mix the molecular sieve obtained in the step (6) with distilled water at 5:1 liquid-solid mass ratio, and then add 100 ml 1.0 mol/L ammonium fluosilicate solution, heat up to 80° C. and treat for 2 h, wherein the added amount of the ammonium fluosilicate solution is calculated on the basis of 11.8 g ammonium fluosilicate per 100 g molecular sieve obtained in the step (6). Measured by TEM with XPS, the silica-alumina mole ratio in the surface layer of the modified Y molecular sieve treated by secondary dealumination is 40.8, increased by 32;

(8) Treat the Y molecular sieve after ammonium fluosilicate treatment in the step (7) by carbon burning which includes drying it at 120° C. for 2 h and calcinating it at 550° C. for 2 h; thus, a modified Y molecular sieve Y-4 is obtained.

Example 5

(1) Take 200 g initial powder of Na—Y molecular sieve prepared in a testing lab (the silica-alumina mole ratio is 5.0, and the $Na_2O$ content is 10 wt %), mix the Na—Y molecular sieve with 0.8 mol/L ammonium nitrate at 3:1 liquid-solid mass ratio, and carry out ammonium exchange at 70° C. for 3 h; repeat that process for 3 times; after the ammonium exchange, the Na content in the Y molecular sieve calculated in $Na_2O$ is 2.0 wt %;

(2) Treat the Y molecular sieve obtain in the step (1) by hydrothermal treatment at 560° C. temperature and 0.1 MPa pressure for 2 h;

(3) Mix the molecular sieve obtained in the step (2) with distilled water at 6:1 liquid-solid mass ratio and stir the mixture, and then heat up to 90° C.; add 600 ml 0.8 mol/L aluminum sulfate solution in the stirring process, and hold for 2 h at the temperature for reaction;

(4) Dry the molecular sieve obtained in the step (3) at 200° C. for 4 h; thus, a Y molecular sieve treated by primary dealumination is obtained; measured by chemical analysis, the silica-alumina mole ratio of the Y molecular sieve is 9.5, increased by 4.5;

(5) Immerse the molecular sieve obtained in the step (4) in methyl benzene solvent for 3 h;

(6) Dry the molecular sieve treated in the step (5) at 130° C. for 5 min., so that 90 vol % of pores and channels in the Y molecular sieve treated by primary dealumination is filled by the liquid carbon source;

(7) Mix the molecular sieve obtained in the step (6) with distilled water at 5:1 liquid-solid mass ratio, and then add 150 ml 0.9 mol/L ammonium fluosilicate solution, heat up to 90° C. and treat for 2 h, wherein the added amount of the ammonium fluosilicate solution is calculated on the basis of 16 g ammonium fluosilicate per 100 g molecular sieve obtained in the step (6). Measured by TEM with XPS, the silica-alumina mole ratio in the surface layer of the modified Y molecular sieve treated by secondary dealumination is 56.5, increased by 47;

(8) Treat the Y molecular sieve after ammonium fluosilicate treatment in the step (7) by carbon burning which includes drying it at 120° C. for 2 h and calcinating it at 550° C. for 2 h; thus, a modified Y molecular sieve Y-5 is obtained.

Example 6

(1) Take 200 g initial powder of Na—Y molecular sieve prepared in a testing lab (the silica-alumina mole ratio is 4.7, and the $Na_2O$ content is 13 wt %), mix the Na—Y molecular sieve with 0.8 mol/L ammonium nitrate at 3:1 liquid-solid mass ratio, and carry out ammonium exchange at 70° C. for 3 h; repeat that process for 3 times; after the ammonium exchange, the Na content in the Y molecular sieve calculated in $Na_2O$ is 2.0 wt %;

(2) Treat the Y molecular sieve obtain in the step (1) by hydrothermal treatment at 560° C. temperature and 0.1 MPa pressure for 2 h;

(3) Mix the molecular sieve obtained in the step (2) with 400 ml 0.5 mol/L oxalic acid solution (the concentration is calculated in $H^+$) at 8:1 liquid-solid mass ratio and stir the mixture, and then heat up to 50° C. and hold for 2 h at the temperature for reaction;

(4) Dry the molecular sieve obtained in the step (3) at 200° C. for 4 h; thus, a Y molecular sieve treated by primary dealumination is obtained; measured by chemical analysis, the silica-alumina mole ratio of the Y molecular sieve is 8.9, increased by 4.2;

(5) Immerse the molecular sieve obtained in the step (4) in methyl benzene solvent for 3 h; (6) Dry the molecular sieve treated in the step (5) at 130° C. for 5 min., so that 80 vol % of pores and channels in the Y molecular sieve treated by primary dealumination is filled by the liquid carbon source;

(7) Mix the molecular sieve obtained in the step (6) with 1.0 mol/L hydrochloric acid solution (the concentration is calculated in $H^+$) at 7:1 liquid-solid mass ratio, and treat at 95° C. for 2 h; measured by TEM with XPS, the silica-alumina mole ratio in the surface layer of the modified Y molecular sieve treated by secondary dealumination is 58.9, increased by 50;

(8) Treat the Y molecular sieve after acid treatment in the step (7) by carbon burning which includes drying it at 120° C. for 2 h and calcinating it at 550° C. for 2 h; thus, a modified Y molecular sieve Y-6 is obtained.

Example 7

Prepare a modified Y molecular sieve with the method described in the example 6, but dry the molecular sieve at 130° C. for 25 min. in the step (6), so that 40% or more of pores and channels in the Y molecular sieve treated by primary dealumination are filled by the carbon source. Thus, a modified Y molecular sieve Y-7 is obtained.

Figure 2:
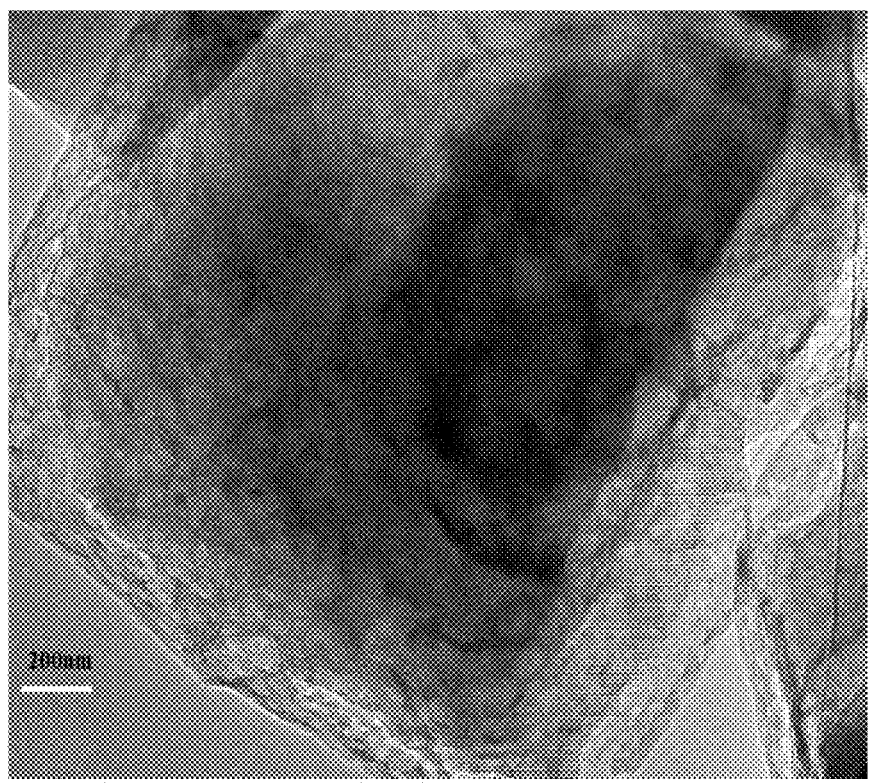
FIG. 2 is a TEM photo of the modified Y molecular sieve prepared in example 7.

Observe the modified Y molecular sieve Y-7 on a TEM. The photo is shown in FIG. 2. It can be seen that the TEM photo of the molecular sieve Y-7 prepared in the example 7 shows a clear boundary, wherein the light-colored outer layer is the surface coat described in the present invention.

Comparative Example 1

(1) Take 200 g initial powder of Na—Y molecular sieve prepared in a testing lab (the silica-alumina mole ratio is 5.2, and the $Na_2O$ content is 12 wt %), mix the Na—Y molecular sieve with 2.0 mol/L ammonium nitrate at 6:1 liquid-solid mass ratio, and carry out ammonium exchange at 95° C. for 3 h; repeat that process for 2 times; after the ammonium exchange, the Na content in the Y molecular sieve calculated in Na$_2$O is 2.0 wt %;

(2) Mix the molecular sieve obtained in the step (1) with distilled water at 5:1 liquid-solid mass ratio, and then add 100 ml 0.8 mol/L ammonium fluosilicate solution, and treat for 2 h at 95° C.;

(3) Treat the Y molecular sieve obtain in the step (2) by hydrothermal treatment at 550° C. temperature and 0.1 MPa pressure for 2 h;

(4) Mix the molecular sieve obtained in the step (3) with 0.4 mol/L hydrochloric acid solution (the concentration is calculated in H$^+$) at 5:1 liquid-solid mass ratio, and treat at 90° C. for 2 h;

(5) Dry the Y molecular sieve after acid treatment in the step (4) at 120° C. for 2 h, and calcinate it at 550° C. for 2 h; thus, a modified Y molecular sieve BY-1 is obtained.

Comparative Example 2

(1) Take 200 g initial powder of Na—Y molecular sieve prepared in a testing lab (the silica-alumina mole ratio is 5.2, and the Na$_2$O content is 12 wt %), mix the Na—Y molecular sieve with 2.0 mol/L ammonium nitrate at 6:1 liquid-solid mass ratio, and carry out ammonium exchange at 95° C. for 3 h; repeat that process for 2 times; after the ammonium exchange, the Na content in the Y molecular sieve calculated in Na$_2$O is 2.0 wt %;

(2) Treat the Y molecular sieve obtain in the step (1) by hydrothermal treatment at 530° C. temperature and 0.1 MPa pressure for 2 h;

(3) Mix the molecular sieve obtained in the step (2) with 0.5 mol/L citric acid solution (the concentration is calculated in Ft) at 5:1 liquid-solid mass ratio, and treat at 80° C. for 2 h;

(4) Dry the Y molecular sieve after acid treatment in the step (3) at 120° C. for 2 h, and calcinate it at 550° C. for 2 h; thus, a modified Y molecular sieve BY-2 is obtained.

Comparative Example 3

Prepare a modified Y molecular sieve with the method disclosed in CN101450320A.

(1) Take 200 g initial powder of Na—Y molecular sieve prepared in a testing lab (the silica-alumina mole ratio is 5.4, and the Na$_2$O content is 11 wt %), mix the Na—Y molecular sieve with 0.8 mol/L ammonium nitrate at 3:1 liquid-solid mass ratio, and carry out ammonium exchange at 70° C. for 3 h; repeat that process for 2 times; after the ammonium exchange, the Na content in the Y molecular sieve calculated in Na$_2$O is 2.6 wt %;

(2) Mix the Y molecular sieve obtained in the step (1) with 650 ml deionized water to prepare a slurry, heat up to 95° C., add a water solution prepared with 17.3 g ammonium hexafluorosilicate and 300 ml deionized water in droplets quickly at a constant adding rate, and then stir the slurry at 95° C. and hold for 2 h;

(3) stop stirring, hold for 10 min., and then separate the molecular sieve in the upper part of the flask by decantation; wash with water for 3 cycles, and then filter, and dry the filter cake in an oven at 120° C. for 5 h;

(4) Treat the molecular sieve obtained in the step (3) by hydrothermal treatment at 530° C. temperature and 0.1 MPa pressure for 2 h;

(5) Place the molecular sieve obtained in the step (4) in a mixed water solution of aluminum sulfate/citric acid (the concentrations of aluminum sulfate and citric acid are 0.3 mol/L and 0.2 mol/L respectively) at 20:1 weight ratio.

Thus, a modified Y molecular sieve BY-3 is obtained.

Comparative Example 4

Prepare a modified Y molecular sieve with the method described in the example 6, but exclude the steps (5) and (6); instead, directly carry out secondary dealumination and silicon reinsertion. Thus, a modified Y molecular sieve BY-4 is obtained.

Comparative Example 5

Prepare a modified Y molecular sieve with the method described in the example 6, but, in the step (7), mix the molecular sieve obtained in the step (6) with 0.3 mol/L hydrochloric acid solution (the concentration is calculated in H$^+$) at 7:1 solid-liquid mass ratio, and treat at 65° C. for 2 h; the silica-alumina mole ratio in the Y molecular sieve treated by secondary dealumination is increased by 6, and a modified Y molecular sieve BY-5 is obtained.

The physical and chemical properties of the modified Y molecular sieves in the examples 1-7 and the comparative examples 1-5 are shown in the following Table 2.

Example 8

This example is provided to describe the preparation of a hydrocracking catalyst.

(1) Prepare W—Ni impregnation solution: take 430 g ammonium metatungstate and 440 g nickelous nitrate and dissolve them in water to prepare 1000 ml impregnation solution; the contents of active metal materials (calculated in WO$_3$ and NiO respectively) in the obtained impregnation solution are 36 g/100 ml and 11 g/100 ml, and the solution is numbered as RY;

(2) Take the molecular sieves prepared in the examples 1-7 and the comparative examples 1-5 and mix them with alumina at 50:50 ratio to prepare supports ZY-1, ZY-2, ZY-3, ZY-4, ZY-5, ZY-6, ZY-7, ZBY-1, ZBY-2, ZBY-3, ZBY-4 and ZBY-5 respectively;

(3) Impregnate the supports obtained in the step (2) with the impregnation solution RY, respectively, so as to obtain catalysts Cat-1, Cat-2, Cat-3, Cat-4, Cat-5, Cat-6, Cat-7, BCat-1, BCat-2, BCat-3, BCat-4 and BCat-5, respectively.

Example 9

Test and evaluate the catalysts Cat-1, Cat-2, Cat-3, Cat-4, Cat-5, Cat-6, Cat-7, BCat-1, BCat-2, BCat-3, BCat-4 and BCat-5 on a small evaluation device respectively.

The evaluation device employs a single-stage single-pass process, the pretreating unit is charged with a hydrocracking pretreatment catalyst FF-36 (from SINOPEC Fushun Research Institute of Petroleum and Petrochemicals), and the hydrocracking unit is charged with the catalysts respectively.

The raw oil shown in Table 1 is loaded into the pretreating unit for hydrogenation pretreatment to obtain refined oil; the refined oil is taken as the raw material to be hydrocracked and is loaded into the hydrocracking unit for hydrocracking; thus, the reaction products are obtained. The evaluation conditions and results are shown in Tables 3-4, wherein the nitrogen content in the refined oil is 10 μg/g.

The nitrogen content in the refined oil is increased to 80 m/g, and the hydrocracking results of Cat-1, BCat-1 and BCat-2 are compared. The evaluation conditions and results are shown in Tables 5-8.

TABLE 1

| Item | Raw oil |
| --- | --- |
| Density, g/cm³ | 0.9138 |
| Distillation range, ° C. | 320-535 |
| C, m % | 86.45 |
| H, m % | 12.53 |
| S, m % | 1.4 |
| N, µg/g | 1200 |
| BMCI value | 39.0 |

TABLE 2

| Modified Y molecular sieve | Y-1 | Y-2 | Y-3 | Y-4 | Y-5 | Y-6 | Y-7 | BY-1 | BY-2 | BY-3 | BY-4 | BY-5 |
| --- | --- | --- | --- | --- | --- | --- | --- | --- | --- | --- | --- | --- |
| Thickness of surface layer, nm | 80 | 190 | 70 | 50 | 20 | 120 | 300 | — | — | — | — | 116 |
| Silica-alumina mole ratio in surface layer | 36.9 | 53 | 62.6 | 40.8 | 56.5 | 58.9 | 63 | — | — | — | — | 15 |
| Silica-alumina ratio in the body phase of molecular sieve | 15 | 23 | 22.3 | 13.2 | 10.8 | 23 | 43 | 22 | 11 | 20 | 48 | 9.5 |
| Acid amounted measured by NIS, mmol/g | 0.98 | 0.69 | 0.70 | 0.90 | 0.92 | 0.60 | 0.44 | 0.58 | 0.88 | 0.65 | 0.35 | 0.95 |
| Specific surface area, m²/g | 740 | 670 | 820 | 750 | 700 | 680 | 700 | 740 | 700 | 700 | 552 | 685 |
| Pore volume, ml/g | 0.36 | 0.52 | 0.36 | 0.36 | 0.38 | 0.50 | 0.47 | 0.37 | 0.42 | 0.48 | 0.51 | 0.44 |
| Crystallinity, % | 98 | 85 | 107 | 98 | 95 | 87 | 92 | 95 | 85 | 80 | 62 | 88 |
| Grain size of molecular sieve, nm | 1000 | 1350 | 1005 | 980 | 850 | 1100 | 1000 | 1000 | 1000 | 980 | 900 | 1000 |

TABLE 3

| Catalyst | Cat-1 | Cat-2 | Cat-3 | Cat-4 | Cat-5 | Cat-6 | Cat-7 | BCat-1 | BCat-2 | BCat-3 | BCat-4 | BCat-5 |
| --- | --- | --- | --- | --- | --- | --- | --- | --- | --- | --- | --- | --- |
| Reaction temperature, ° C. | 370 | 370 | 370 | 370 | 370 | 370 | 370 | 370 | 370 | 370 | 370 | 370 |
| Reaction pressure, MPa | 15.0 | 15.0 | 15.0 | 15.0 | 15.0 | 15.0 | 15.0 | 15.0 | 15.0 | 15.0 | 15.0 | 15.0 |
| Volumetric space velocity in the cracking section, h⁻¹ | 1.5 | 1.5 | 1.5 | 1.5 | 1.5 | 1.5 | 1.5 | 1.5 | 1.5 | 1.5 | 1.5 | 1.5 |
| Volume ratio of hydrogen/oil | 1200 | 1200 | 1200 | 1200 | 1200 | 1200 | 1200 | 1200 | 1200 | 1200 | 1200 | 1200 |
| Nitrogen content in the refined oil, ppm | 10 | 10 | 10 | 10 | 10 | 10 | 10 | 10 | 10 | 10 | 10 | 10 |

TABLE 4

| Catalyst | Cat-1 | Cat-2 | Cat-3 | Cat-4 | Cat-5 | Cat-6 | Cat-7 | BCat-1 | BCat-2 | BCat-3 | BCat-4 | BCat-5 |
| --- | --- | --- | --- | --- | --- | --- | --- | --- | --- | --- | --- | --- |
| Product distribution, wt % | | | | | | | | | | | | |
| Light naphtha <65° C. | 7.23 | 3.01 | 4.51 | 7.05 | 7.55 | 3.10 | 1.95 | 2.21 | 7.20 | 2.80 | 1.2 | 8.10 |
| Heavy naphtha within 65-177° C. range | 43.02 | 32.8 | 31.4 | 40.52 | 41.20 | 31.6 | 15.2 | 22.02 | 43.19 | 28.5 | 10.3 | 44.6 |
| Jet fuel within 177-260° C. range | 19.50 | 18.02 | 18.22 | 17.72 | 17.82 | 18.10 | 19.8 | 17.12 | 19.22 | 17.5 | 28 | 17.4 |
| Diesel oil within 260-350° C. range | 9.87 | 16.45 | 16.26 | 9.46 | 9.58 | 17.25 | 25.21 | 19.51 | 9.85 | 19.32 | 15 | 8.25 |
| Tailings >350° C. | 16.02 | 26.0 | 26.2 | 21.20 | 19.58 | 26.2 | 34.2 | 32.2 | 16.52 | 28.2 | 42 | 15.3 |
| Product properties | | | | | | | | | | | | |
| Heavy naphtha | | | | | | | | | | | | |
| Aromatic potential % | 55.5 | 58 | 57.5 | 56 | 55.5 | 57.5 | 56 | 54.0 | 55.0 | 55 | 53 | 54.0 |
| Jet fuel | | | | | | | | | | | | |
| Smoke point, mm | 28 | 27 | 26 | 27 | 27 | 26 | 25 | 24 | 27 | 25 | 22 | 28 |
| Diesel distillate | | | | | | | | | | | | |
| Sulfur content, ppm | 5 | 5 | 5 | 5 | 5 | 5 | 5 | 5 | 5 | 5 | 5 | 5 |
| Cetane number | 67 | 63 | 63 | 66 | 67 | 63 | 66 | 58 | 67 | 63 | 57 | 68 |
| Hydrogenated tailings | | | | | | | | | | | | |
| BMCI | 7.8 | 10.2 | 10.0 | 9.7 | 9.2 | 10.3 | 11.8 | 12.2 | 7.5 | 11.2 | 13.5 | 7.4 |

TABLE 5

| Catalyst | Cat-1 | | | BCat-1 | | |
|---|---|---|---|---|---|---|
| Reaction temperature, ° C. | 370 | 373 | 374 | 370 | 395 | 399 |
| Reaction pressure, MPa | 15.0 | 15.0 | 15.0 | 15.0 | 15.0 | 15.0 |
| Volumetric space velocity, h$^{-1}$ | 1.5 | 1.5 | 1.5 | 1.5 | 1.5 | 1.5 |
| Volume ratio of hydrogen/oil | 1200:1 | 1200:1 | 1200:1 | 1200:1 | 1200:1 | 1200:1 |
| Nitrogen content in the refined oil, ppm | | | 80 | | | |
| Operation time, h | 400 | 1000 | 2000 | 400 | 1000 | 2000 |
| Conversion rate, % | 83.0 | 83.2 | 83.1 | 65.0 | 65.5 | 65.2 |

TABLE 6

| Catalyst | Cat-1 | | | BCat-2 | | |
|---|---|---|---|---|---|---|
| Reaction temperature, ° C. | 370 | 373 | 375 | 370 | 382 | 386 |
| Reaction pressure, MPa | 15.0 | 15.0 | 15.0 | 15.0 | 15.0 | 15.0 |
| Volumetric space velocity, h$^{-1}$ | 1.5 | 1.5 | 1.5 | 1.5 | 1.5 | 1.5 |
| Volume ratio of hydrogen/oil | 1200:1 | 1200:1 | 1200:1 | 1200:1 | 1200:1 | 1200:1 |
| Nitrogen content in the refined oil, ppm | | | 80 | | | |
| Operation time, h | 400 | 1000 | 2000 | 400 | 1000 | 2000 |
| Conversion rate, % | 83.0 | 83.2 | 82.1 | 74.0 | 74.2 | 75.1 |

TABLE 7

| Catalyst | Cat-1 | | | BCat-3 | | |
|---|---|---|---|---|---|---|
| Reaction temperature, ° C. | 370 | 373 | 375 | 370 | 385 | 392 |
| Reaction pressure, MPa | 15.0 | 15.0 | 15.0 | 15.0 | 15.0 | 15.0 |
| Volumetric space velocity, h$^{-1}$ | 1.5 | 1.5 | 1.5 | 1.5 | 1.5 | 1.5 |
| Volume ratio of hydrogen/oil | 1200:1 | 1200:1 | 1200:1 | 1200:1 | 1200:1 | 1200:1 |
| Nitrogen content in the refined oil, ppm | | | 80 | | | |
| Operation time, h | 400 | 1000 | 2000 | 400 | 1000 | 2000 |
| Conversion rate, % | 83.0 | 83.2 | 82.1 | 68.0 | 67.8 | 68.0 |

TABLE 8

| Catalyst | Cat-1 | | | BCat-5 | | |
|---|---|---|---|---|---|---|
| Reaction temperature, ° C. | 370 | 373 | 375 | 370 | 380 | 384 |
| Reaction pressure, MPa | 15.0 | 15.0 | 15.0 | 15.0 | 15.0 | 15.0 |
| Volumetric space velocity, h$^{-1}$ | 1.5 | 1.5 | 1.5 | 1.5 | 1.5 | 1.5 |
| Volume ratio of hydrogen/oil | 1200:1 | 1200:1 | 1200:1 | 1200:1 | 1200:1 | 1200:1 |
| Nitrogen content in the refined oil, ppm | | | 80 | | | |
| Operation time, h | 400 | 1000 | 2000 | 400 | 1000 | 2000 |
| Conversion rate, % | 83.0 | 83.2 | 82.1 | 80.0 | 79.8 | 81.0 |

It can be seen from the comparison tests on the evaluation device: compared with the catalysts prepared in the comparative examples, the catalyst prepared with the method disclosed in the present invention has higher reactivity and higher nitrogen tolerance.

The hydrocracking catalyst provided in the present invention still can support the hydrocracking reaction effectively and can attain a higher conversion rate compared with the prior art, even when the nitrogen content in the raw material to be hydrocracked is high (10-80 µg/g).

What is claimed is:

1. A modified Y molecular sieve, having a silica-alumina mole ratio in a surface layer of the modified Y molecular sieve of 20-100:1, a silica-alumina mole ratio in a bulk of the modified Y molecular sieve of 8-30:1, and the silica-alumina mole ratio in the surface layer of the modified Y molecular sieve is at least 10 times higher than the silica-alumina mole ratio in the bulk of the modified Y molecular sieve.

2. The modified Y molecular sieve according to claim 1, wherein the silica-alumina mole ratio in the surface layer of the modified Y molecular sieve is 20-70 times higher than the silica-alumina mole ratio in the bulk of the modified Y molecular sieve.

3. The modified Y molecular sieve according to claim 1, wherein the silica-alumina mole ratio in the surface layer is 30-80:1.

4. The modified Y molecular sieve according to claim 1, wherein a thickness of the surface layer is 10-200 nm.

5. The modified Y molecular sieve according to claim 1, wherein the surface layer is formed by in-situ dealumination, and a grain size of the modified Y molecular sieve is 0.4-1.2 µm.

6. The modified Y molecular sieve according to claim 1, wherein an acid content measured by near infrared spectrometry (NIS) in the modified Y molecular sieve is 0.3-1.5 mmol/g; a specific surface area of the modified Y molecular sieve is 600-900 m²/g; a pore volume is 0.2-0.7 ml/g; a relative crystallinity is 60-130%; a crystal cell constant of the modified Y molecular sieve is 2.425-2.455 nm.

7. A method for preparing a modified Y molecular sieve of claim 1, comprising:
   (1) treating Na—Y zeolite by ammonium exchange, till the Na content calculated in Na₂O in the Y molecular sieve obtained through ammonium exchange is not higher than 3 wt %;
   (2) treating the Y molecular sieve obtained through ammonium exchange in the step (1) by primary dealumination, so that the silica-alumina mole ratio in the obtained Y molecular sieve is increased by 2-8;
   (3) treating the Y molecular sieve treated by primary dealumination in the step (2) by carbon deposition treatment, so that 60-90 vol % of pores and channels in the Y molecular sieve treated by primary dealumination are filled;
   (4) treating the product obtained in the step (3) by secondary dealumination, to form a surface layer of the modified Y molecular sieve, in which the silica-alumina mole ratio is increased by 10-80 compared with the silica-alumina mole ratio in the Y molecular sieve treated by primary dealumination;
   (5) treating the Y molecular sieve obtained in the step (4) by carbon burning.

8. The method according to claim 7, wherein in the Na—Y zeolite, the silica-alumina mole ratio is 3-6, and the content of Na₂O is 6-15 wt %; the ammonium exchange is carried in a water solution of ammonium salt, and the concentration of the water solution of ammonium salt is 0.3-6 mol/L; the temperature of the ammonium exchange is 60-120° C., and the time of the ammonium exchange is 1-3 h.

9. The method according to claim 7, wherein the primary dealumination treatment is one or more of hydrothermal treatment, acid treatment, aluminum salt treatment, and ammonium fluosilicate treatment.

10. The method according to claim 7, wherein in the step (3), the carbon deposition treatment is carried out in the following Approach A and/or Approach B:
   Approach A:
   (I) impregnating the Y molecular sieve treated by primary dealumination in a liquid carbon source, so that the liquid carbon source is filled into the pores and channels in the Y molecular sieve treated by primary dealumination, wherein the liquid carbon source is a $C_5$-$C_{15}$ hydrocarbon solvent;
   (II) removing the liquid carbon source partially by volatilization, so that 60-90 vol % of pores and channels in the Y molecular sieve treated by primary dealumination are filled by the liquid carbon source;
   Approach B:
   (I') contacting the Y molecular sieve treated by primary dealumination with a carbon source, so that the carbon source is filled into the pores and channels in the Y molecular sieve treated by primary dealumination, wherein the carbon source is $C_2$-$C_{10}$ normal or isomeric monoene, or dialkene;
   (II') carrying out a carbon deposition reaction in an oxygen-bearing atmosphere, so that the carbon source in the Y molecular sieve treated by primary dealumination is converted into carbon;
   (III') removing the carbon partially, so that 60-90 vol % of pores and channels in the Y molecular sieve treated by primary dealumination are filled by carbon.

11. The method according to claim 10, wherein
   in the Approach A, the liquid carbon source is selected from at least one of paraffin hydrocarbon, petroleum ether, carbon tetrachloride, benzene, methyl benzene, ethyl benzene, and dimethyl benzene; the impregnation is saturated impregnation, and the impregnation time is 1-5 h; the liquid carbon source is removed partially by volatilization implemented by evaporating the solvent;
   in the Approach B, the carbon source is at least one of butadiene, pentylene, hexadiene, butylene, pentene, heptylene, and nonylene; the Y molecular sieve treated by primary dealumination is controlled to contact with the carbon source fully by placing the Y molecular sieve treated by primary dealumination in an enclosed atmosphere that contains the gas of the carbon source or in a liquid that contains the carbon source; the carbon is removed partially by calcination at a temperature of 400-600° C.

12. The method according to claim 11, wherein
   in the Approach A, the evaporation for removing the solvent is heat drying, the temperature of heat drying is higher than the boiling point of the hydrocarbon solvent, and the time of heat drying is 1-60 min.;
   in the Approach B, when the carbon source is in gas state at room temperature, the Y molecular sieve treated by primary dealumination is contacted with the carbon source by holding the Y molecular sieve treated by primary dealumination in an enclosed atmosphere that contains the gas of the carbon source at 0.1-1.0 MPa pressure for 0.1-2 h; when the carbon source is in liquid state at room temperature, the Y molecular sieve treated by primary dealumination is contacted with the carbon source by impregnating the Y molecular sieve treated by primary dealumination in a liquid that contains the carbon source fully to contact at 0.1-1.0 MPa pressure for 0.5-4 h.

13. The method according to claim 10, wherein in the Approach B, the carbon deposition reaction happens in an oxygen-bearing atmosphere, in which the oxygen content is 10-100 vol %; the temperature of the carbon deposition reaction is 50-500° C., and the time of the carbon deposition reaction is 1-50 h.

14. The method according to claim 7, wherein in the step (4), the secondary dealumination treatment is an acid dealumination process and/or ammonium fluosilicate dealumination and silicon reinsertion process.

15. The method according to claim 7, wherein in the step (5), the carbon burning treatment is implemented by calcination the Y molecular sieve treated by secondary dealumination at 400-600° C. for 2-4 h.

16. A supported catalyst, comprising a hydrogenation active component and a support, wherein the support comprises the modified Y molecular sieve according to claim 1.

17. The supported catalyst according to claim 16, wherein a specific surface area of the supported catalyst is 200-400 m²/g, and a pore volume of the supported catalyst is 0.2-0.5 ml/g.

18. The supported catalyst according to claim 16, wherein a content of the modified Y molecular sieve in the support is 15-90 wt %.

19. The supported catalyst according to claim 16, wherein the hydrogenation active component is a Group VIB metal and/or a Group VIII metal.

20. The supported catalyst according to claim 19, wherein based on a total weight of the supported catalyst, a content of the Group VIB metal, calculated in metal oxide, is 10-40 wt %, and a content of the Group VIII metal, calculated in metal oxide, is 3-15 wt %; and a content of the support is 45-87 wt %.

* * * * *

UNITED STATES PATENT AND TRADEMARK OFFICE
CERTIFICATE OF CORRECTION

PATENT NO. : 10,112,840 B2
APPLICATION NO. : 14/930707
DATED : October 30, 2018
INVENTOR(S) : Wei Liu et al.

It is certified that error appears in the above-identified patent and that said Letters Patent is hereby corrected as shown below:

On the Title Page

Item [73], delete:
"PETROCHEMICALS SINOPEC"
And insert:
--PETROCHEMICALS, SINOPEC--.

Signed and Sealed this
Fifteenth Day of January, 2019

Andrei Iancu
*Director of the United States Patent and Trademark Office*